INVENTOR
MICHAEL MODELL
BY Richard P Crowley
ATTORNEY

INVENTOR.
MICHAEL MODELL

United States Patent Office 3,455,817
Patented July 15, 1969

3,455,817
METHOD OF AND APPARATUS FOR THE RECOVERY OF FRACTIONS FROM CHROMATOGRAPHIC FRACTIONS
Michael Modell, Brighton, Mass., assignor to Abcor, Inc., Cambridge, Mass., a corporation of Massachusetts
Continuation-in-part of application Ser. No. 539,709, Apr. 4, 1966. This application July 31, 1968, Ser. No. 756,707
Int. Cl. B01d 15/08, 13/00
U.S. Cl. 210—23                                    16 Claims

ABSTRACT OF THE DISCLOSURE

A chromatographic system which includes two separation systems and a collection system is composed of a chromatographic column wherein the fluid effluent stream is directed into one or more membrane units comprising a feed zone and a permeate zone which zones are separated by membrane material through which one component of the effluent stream, e.g. the carrier fluid, diffuses at a more rapid rate than the other components of the effluent stream. The carrier-enriched stream is removed from the membrane unit and, after appropriate clean-up, is recycled for use in the same or a different chromatographic column. The fraction-enriched fluid stream is withdrawn from the membrane unit and either sent to additional membrane units for further concentration or is recovered directly by suitable collecting means.

---

This application is a continuation-in-part of application, Ser. No. 539,709, filed Apr. 4, 1966, now abandoned.

My invention concerns chromatographic collection systems and in particular relates to methods of and means for the concentration or collection of gas and liquid effluent fractions from chromatographic systems.

Chromatography provides the means for separating a fluid mixture into various individual constituents or fractions and often into fractions of extremely high purity. Typically a sample of the material to be separated is introduced into a chromatographic column, which column contains a separatory material which selectively retards one or more constituents or fractions as the sample material passes from the one to the other end of the column. A carrier fluid may be introduced into the column to drive the fluid sample material through the column. Since several fractions or constituents of the fluid mixture in the column travel through the column at different rates depending upon their respective affinities for the separatory material in the column, the resultant effluent stream from the column outlet first comprises the carrier fluid alone and then the carrier fluid containing particular separated constituents or fractions at timed intervals. The particular fraction appearing in the effluent stream depends upon the relative rate of travel of that fraction through the column.

Accordingly, chromatographic systems provide a means to separate a fluid mixture into individual constituents or fractions in a carrier fluid. In preparative or production scale chromatographic systems, in comparison with analytical systems, the collection or recovery of one or more specific fractions or constituents from the effluent stream is desired. For example, the usual technique of collecting a gas fraction from a gas chromatographic system involves the direct cooling of the fraction-containing effluent stream to cause the condensation of the fraction to a liquid or solid state. The fraction is then recovered from the condenser and/or from a phase separator, while the carrier gas is usually recycled back for use in the chromatographic column. In many cases, the efficiency of collection employing direct cooling of the effluent stream is quite low, and where expensive or exotic fractions are to be collected or removed, these direct means are usually economically unattractive or inadequate. Collection efficiency, i.e., the percent of the fraction recovered from the stream, of 90 percent or 95 percent or higher, is often desirable or required for the economic use of preparative or production chromatographic systems. Preparative systems normally employ chromatographic columns having an internal diameter of about 1 to 6 inches, while production scale systems refer to larger diameter columns such as from 1 to 4 feet or greater. In such systems the fixed capital and operating costs of a high efficiency fraction collecting scheme employing a refrigeration system is often a considerable part of the total fixed and operating cost of the system. It is, therefore, most desirable to provide fraction collecting systems of reduced cost and high efficiency.

Other techniques suggested such as in U.S. Patent No. 3,002,583 include the direct adsorption of the gas fraction or carrier on a solid adsorbent and the subsequent stripping of the fraction from the adsorbent with steam. This technique, while sometimes avoiding the problems associated with direct cooling, cannot be employed with those gas fractions which are heat or temperature-sensitive. In addition, such systems require adsorber vessels, steam generating systems, stripping systems and the like, as well as a variety of complex valve and timing means. Such systems have also suggested the absorption of the carrier gas in a liquid absorbent and the subsequent condensation of the gas fraction by direct cooling. As will be apparent, the removal of the carrier gas which represents the bulk of the effluent stream in such systems, is often technically and economically unattractive, particularly where common carrier gases like helium and nitrogen are employed.

The fraction collecting of the gas fraction in an effluent stream from a gas chromatographic column presents several unique difficulties. Usually, the effluent gas stream withdrawn from the outlet of a gas chromatographic column has a very low concentration of the gas fraction to be recovered. If the fraction to be recovered exceeds 50 percent or more in the gas effluent stream, direct cooling may be the preferred method of collection, while lesser amounts such as less than 25 percent may require special techniques for collection efficiencies of 90 percent or more. For example, the effluent gas stream may typically contain only 0.1 to 10.0 mol percent of the desired gas fraction in the inert carrier gas stream. Where very expensive sample materials such as steroids, essential oils, flavors, special research mixtures, and the like are processed, the amount of the sample fraction in the effluent gas stream may be even lower, such as from 0.001 to about 0.1 mol percent. The dilution of the sample vapor with the inert carrier gas, therefore, presents unique problems in efficient fraction collecting. Rapid and direct cooling of the effluent steram to condense the desired fraction provides condensation, but quite often in the form of a fog or aerosol of the fraction in the carrier stream which makes the easy and efficient recovery of the fraction in the fog increasingly more difficult and expensive. Additionally, the cooling of the carrier gas which occupies the bulk of the effluent gas stream is quite expensive and often requires a large, expensive refrigeration system. Therefore, fraction collecting systems for gas chromatographic units which are simple, practical, economical, efficient and which avoid at least some of the difficulties of the present practices are most desirable.

It is an object of my invention to provide a method of and apparatus for the collection of fractions from chromatographic systems, which methods and apparatus avoid many of the difficulties associated with prior collection systems.

Another object of my invention is to provide a means for efficiently concentrating a fraction to be recovered in an effluent stream to enable the fraction to be more easily recovered at higher efficiency from such concentrated stream by condensation.

A further object of my invention is to provide means for the collection of fluid fractions from a fluid effluent chromatographic stream at high efficiency and low cost and without the need to subject the effluent gas stream to elevated temperatures.

Still another object of this invention is to provide a means for separating components of a solution of varying size and molecular weight.

Other objects and advantages of my invention will be apparent to those persons skilled in the art from the following more detailed description of the invention taken with the accompanying drawing wherein there is illustrated a schematic process flow diagram for the collection of a gas fraction from a gas chromatographic column.

Briefly my invention comprises the collection or concentration of a fluid fraction from a fluid effluent stream by permeating one or more components or fractions of the stream through a thin, semi-permeable membrane, and the recovery of the fraction from the concentrated stream. In my preferred embodiment a fluid effluent stream from a chromatographic system is directed into a membrane unit comprising a permeate zone and a feed zone, which zones are separated by a thin, natural or synthetic membrane material through which the one component of the effluent stream such as the carrier fluid diffuses at a more rapid rate than the other components of the effluent stream. A carrier-enriched stream is removed from the permeate zone and either sent to another higher stage of a membrane unit or recycled back after appropriate clean-up and compression for re-use in the chromatographic column. A fraction-enriched fluid stream is then withdrawn from the feed zone and either sent to additional membrane units for further concentration of the fraction, or the fraction recovered directly from the stream by condensation or other collecting means. In this case the semi-permeable membrane material should be selected to permit the more rapid diffusion of the carrier liquid or gas. My system avoids any degradation of temperature or heat-sensitive fractions in the effluent stream, since the permeating process may be carried out at a column or system temperatures or lower. In addition, my system rapidly and efficiently concentrates the fraction to be recovered, so that direct cooling or other recovery techniques are accomplished in a far more efficient and easy manner by the recovery of massive condensate.

For example, in a typical gas chromatographic system wherein the effluent stream is withdrawn from the outlet of a gas chromatographic column at a temperature range of from about 0 to 300° C. or more, the effluent stream comprising one or more fractions to be recovered may be withdrawn from the column, compressed to a ratio say of from 10 to 200 times the pressure as withdrawn from the column, any condensate recovered and compressed gas introduced into the first stage of a membrane separation unit. A concentrated gas fraction in the gas carrier stream is recovered from one of the zones of the membrane unit, the gas fraction condensed, and the carrier gas recycled for reintroduction into the membrane unit. The carrier gas, free or lean in the gas fraction to be recovered, may then be withdrawn from the other zone of the membrane unit and recycled for further use in the gas chromatographic column or other systems.

My invention is particularly suitable for use, for example, in the separation from a solution of components of varying molecular weight and/or size such as the separation of monomolecular-like proteins, enzymes, high molecular weight starches or polysaccharides from aqueous salts commonly used as buffering agents or reaction by products in the liquid mixture. Such salts generally are of low molecular weight (e.g. less than 100), and are composed of amines, sodium, potassium or ammonium salts; glucose, lactic acid and the like. My invention has advantages in the further separation or concentration of high molecular weight fractions into further fractions or low and high molecular weight fractions from the effluent or a liquid chromatographic system. Typically, a liquid chromatographic column containing separatory material (ion exchange resins, gel, or solid), is operated with a liquid solution (generally aqueous, or an oxygen-containing solvent such as ethanol, or a mixture thereof) having a low concentration of the material to be chromatographically separted. In liquid chromatographic separation systems, the effluent can be processed with a membrane in the form of flat sheet, tubular, or capillary, supported or unsupported. Typical membrane materials include cellulose esters, like cellulose acetate, hydrophilic polymers, acrylics, polyvinyl alcohol, polyvinyl acetate, nylon, Teflon, polyamides, etc. of appropriate permeating properties.

During the chromatographic process, dilution of the sample mixture occurs or band spreading occurs in the column and a carrier liquid used. Concentration of the dilute product mixture from the column can be accomplished by my invention through the use of membranes of appropriate selectivity to permit the easy or rapid permeation of the liquid or solvent into one or more permeate zones for recycle or recovery while, for example, retaining eventually all of the high molecular weight solute such as proteinaceous matter. The pore size or permeation characteristics of the membrane material may be selected to retain material of over 500, 1000, 10,000, 50,000, or 100,000 molecular weight depending upon the fraction desired. A typical example of this technique is shown by FIG. 2.

My invention also permits the use of membranes to provide further separation and processing of the liquid and/or chromatographic fractions. For example, when several components or fractions emerge from the outlet of a chromatographic column simultaneously or in such close relationship that the chromatographic separation is not effective or complete such as when several components weight under a single peak or the individual peaks overlap considerably then the use of a memberane permits further separation. The use of membranes can permit further rejection and processing of these mixtures at about the same time the components are being concentrated or removed from the carrier liquid or gas. A typical example of this further separation process is shown in FIG. 3.

The separation of a wide variety of gas or liquid mixtures may be accomplished by selecting particular membrane material. The separation is accomplished by taking advantage of the difference in the rate at which various fractions or components of the mixtures permeate a thin, solid membrane material, for example, from about 0.1 to 10 mils in thickness. The membrane material divides the membrane unit into a permeate and feed zone and may be in the form of solid or hollow particles, hollow or solid fibers or tubes, thin flat sheets or another form. In my process the gas effluent stream is placed in contact in a feed zone with a membrane wherein one fraction of the effluent stream dissolves into the upstream face of the membrane, diffuses through the membrane driven by a concentration gradient, and into a permeate zone. A concentration gradient is effected by maintaining a low total pressure downstream from the membrane in the permeate zone. It is advantageous to remove the permeate fraction from the permeate zone rapidly to maintain a good concentration gradient as a driving force. Thus, a sweep fluid such as a gas or liquid may be used in the permeate zones such as a counter-flow or cross-flow direction from that of the feed stream and at a flow rate sufficiently high to maintain a low partial pressure of the diffusing component.

Selection of the optimum process conditions for the operation of the membrane unit depends upon a membrane material and the particular components of the effluent stream to be processed. Where the membrane material is in such form as to withstand a pressure difference, for example where the membrane material is supported by screens or the like, a pressure difference between the feed and permeate zones of 10–1,000 p.s.i.a. may be maintained. The selection of a particular temperature to conduct the permeation process depends upon the characteristics of the materials to be processed and the membrane material. In general, the temperature selected should be below the critical solution temperature of the particular membrane employed in the membrane permeation unit, i.e., the melting point of the membrane in contact with the liquid or gas feed effluent stream. The characteristics of the membrane may, therefore, limit the selection of the optimum temperature for the system. In other cases the temperature selected may be less than the critical solution temperature of the system due to the high vapor pressures involved at higher temperatures, so that economic factors on equipment to be required dictate the use of a lower membrane temperature. Membrane temperatures of from 0 to 300° C. may be employed. Often the temperature employed may be the temperature of the gas effluent stream as directly withdrawn from the outlet of the gas chromatographic column or slightly 5–50° C. lower.

The membrane in the membrane unit may be prepared from any organic or inorganic materials which exhibit selective permeation properties toward one or more components of the mixture to be separated. A wide variety of materials are known which exhibit such characteristics. These materials often comprise natural or synthetic polymeric materials which are often used in a thickness of from about 0.1 to 10 or more mils in thickness, e.g., 1 to 5 mils and may be unsupported or supported. The membrane material can be used as produced, alone or in combination with other membrane materials, or treated by radiation, solvents, chemicals, orientation or other techniques to enhance the selectivity for the particular separation and/or the permeation flux. Typical treating methods would include irradiation, chemically reacting the polymer to change its chemical composition and nature, subjecting it to a solvent swelling and/or thermal cycle, orienting it in a particular fashion or direction by thermal or mechanical stress treatment or by radiation or other means.

Typical membrane materials which may be used include but are not limited to: $C_2$–$C_5$ polyolefins such as polyethylene and polypropylene; polyamides such as nylon; polyesters such as Mylar; fluoro polymers such as Teflon; acrylic resins; styrene resins such as polystyrene; rubbers such as neoprene, chloroprene, butyl rubber, polybutadiene, copolymers of butadiene with styrene, butadiene-nitrile copolymers and other natural and synthetic elastomers, and cellulose derivatives such as cellulose ethers and esters such as hydroxyl cellulose, ethyl cellulose, cellulose acetate and cellulose acetate butarate, vinyl chloride resins such as saran, polyvinyl chloride, vinyl chloride-vinyl acetate copolymers, vinyl acetate resins like polyvinyl acetate, silicone rubbers, urethanes, ion exchange resins, glass, ceramics, metal films, paper and the like.

In one embodiment of my invention concentration of the fraction in the fluid carrier stream is accomplished by permitting the permeation of the carrier liquid or gas into the permeate zone and, therefore, the membrane material should have an affinity for the carrier fluid and in another embodiment the gas or liquid fraction permeates into the permeate zone. In gas chromatographic systems typical carrier gasses comprise helium, nitrogen, argon, air, hydrogen, methane, steam and the like or mixtures thereof, while a variety of liquids may be used in liquid chromatographic systems. For example, where helium is the carrier gas the membrane material may comprise a borosilicate-type glass in hollow particle, capillary fiber or sheet form. Although membrane material may be selected for each gas fraction to be recovered it is more practical to design a system wherein the carrier fluid is permeated. This is particularly the case for gas chromatography systems wherein the number of carrier gases used are well-known and limited in number. Thus, a membrane unit which permeates the carrier fluid rather than a particular fraction is far more versatile in use and the selection of membrane material easily made. Typical membrane units and materials are described in U.S. Patents 3,019,853; 3,184,899; 3,228,876 and 3,228,877. Where hydrogen is employed the membrane material may be selected from a variety of thin, metal foils, tubes or capillaries composed of noble and other metals or alloys thereof such as palladium, platinum, palladium and silver, palladium and iridium alloys and other alloys.

In my process the permeation membrane unit may be operated continuously or as a batch process. If desired direct condensation or other cooling or recovery operations may be carried out before or after introduction of the fluid effluent stream into the one or more stages of a permeation membrane system. For example, in gas chromatographic systems particularly where the fraction to be recovered represents a large amount of the effluent stream, for example, over 10 percent, it may be desirable to first directly cool the stream to condense and recover any massive condensate of the fraction material, and thereafter to direct the resulting carrier gas and gas fraction stream into a permeation membrane unit for recovery of the small amounts of the gas fraction. My fraction collection system may be employed with a wide variety of chromatographic systems and includes liquid chromatography systems wherein the liquid solvent or carrier stream is separated from the liquid fraction or the liquid fraction concentrated in a solvent or carrier stream in a liquid-liquid membrane unit. Where a liquid-liquid system is employed the fraction to be recovered may be obtained by distilling or vaporizing and then condensing of the fraction or otherwise removing it from any sweep liquid.

Turning now to the drawing.

Figure 1:
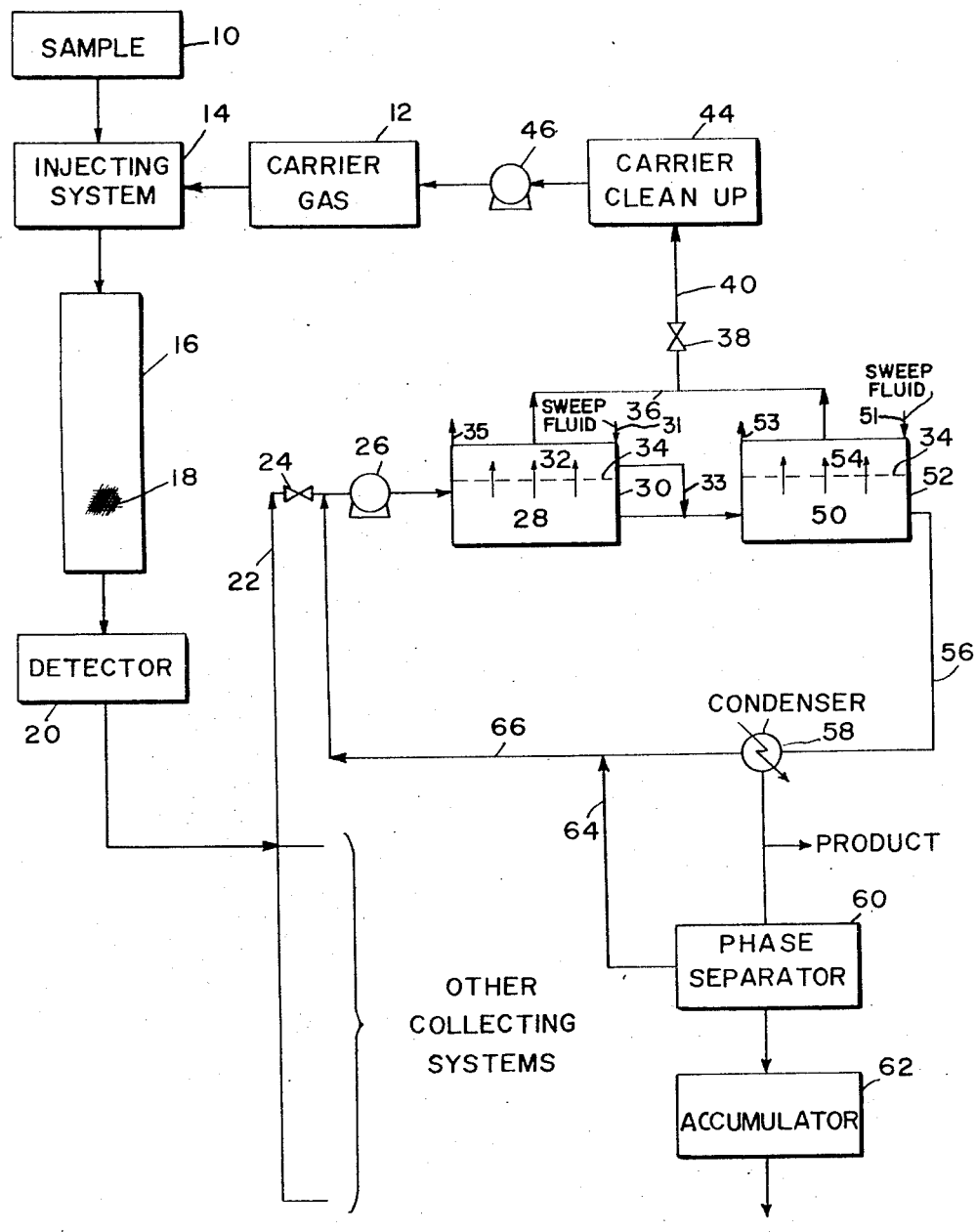
FIG. 1 is a schematic flow process diagram for a gas chromatographic system.

FIG. 1 shows a schematic flow process diagram for a gas chromatographic system which includes my fraction collecting means. For the purposes of illustration only my processes will be described in connection with the recovery of a beta-pinene fraction from a terpene mixture containing alpha-pinene, beta-pinene and at least one other terpene fraction. A terpene mixture containing beta-pinene is introduced from a sample source 10 into an injection system 14 and a predetermined volume of the sample mixture in gas form is injected into the one or upstream end of a relatively large diameter, for example 1 foot, chromatographic column 16 containing a packed bed of separatory material 18. On passage through the column 16, the terpene mixture is separated into its respective gas chromatographic fractions which in this particular case includes alpha-pinene, beta-pinene, and another fraction. The sample mixture is driven to the other or downstream end of the column 16 in a generally axially direction by the use of an inert carrier gas such as helium introduced into the upstream end of the column 16 from a source 12 either into the injection system as shown or directly into the top of the column either mixed with the gas sample or injected between gas sample injections. The separatory material 18 is selected based on the differental adsorption or absorption required to separate the sample mixture into its various chromatographic fractions. In our illustrated example, helium is the carrier gas with the temperature of the column maintained at approximately 150° C. with the separatory material being diatomaceous earth, Johns-Manville Chromosorb W of 60/80 mesh having a liquid phase thereon of poly (diethylene glycol succinate), at 20 gms. per 100 gms. of Chromosorb W. A gas effluent stream containing each fraction is conducted from the exit end of the chromatographic column 16 to and through a detector 20, and, hence, into a manifold conduit 22. The detector employed may be thermalconductivity cells which balance the heat condition of the gas effluent stream from the exit end of the chromatographic column against the pure carrier gas to detect the particular gas fraction being withdrawn from the column. Depending upon the system employed, other detectors such as flame ionization detectors, electron capture detectors, argon ionization detectors, cross-section detectors, electron mobility detectors, ultrasonic detectors, radio frequency detectors, gas density balances, mass spectrometers and other fraction identifying or detecting means may be employed. Those detectors which destroy or change the sample during detection should, of course, be used in side-stream rather than in-stream position. In large diameter columns or systems the operation of the system may be programmed from data obtained on pilot systems and a detector not used or used only intermittently. The gas effluent stream from the chromatographic column is switched to each particular collectvie system only when the particular fraction to be trapped or recovered is emerging from the column.

In my process there may be any number of the same or different collection systems and positions, depending upon the number and type of fractions exiting from the column that are to be recovered. In my illustration three possible collecting positions are shown; however, only one collection system will be described for the recovery of one beta-pinene fraction.

A gas effluent stream comprising helium and the beta-pinene fraction which is to be recovered is withdrawn from manifold 22 through open valve 24 and into compressor 26, wherein the effluent stream is compressed to about 30–500 p.s.i.a. A trap or other container may be included after the compressor 26 to remove any massive condensate liquid formed during compression. The compressed gas effluent stream is then introduced into the one end of a feed zone 28 in a membrane permeation unit 30 comprising the feed zone 28 and a permeate zone 32 separated by thin, supported, hollow, borosilicate glass fibers or tubes illustrated as the membrane material 34 at a temperature of 250° C. The helium carrier gas permeates through the membrane material 34 from the feed zone 28 into the permeate zone 32. The helium carrier gas from the permeate zone is withdrawn through conduit 36, open valve 38 and introduced into recycle conduit 40 where it is recycled to a carrier gas clean-up system for removal of moisture, fraction traces or other impurities, compressed in a compressor 46 and returned to the carrier gas source 12 for recycle to the gas chromatographic column 16. If desired a sweep fluid may be introduced into the permeate zone 32 through conduit 31 and withdrawn from the permeate zone 32 through conduit 35 to remove the effluent stream from the permeate zone. An effluent stream enriched in gas fraction is withdrawn from the other end of the permeate zone 28 and introduced into the feed zone 50 of a stage $n+1$ membrane unit 52 having a permeate zone 54, and a membrane material 34 wherein the permeation process is repeated and additional helium permeated through the membrane 34 and withdrawn as in the first membrane unit 30. Also a portion of the effluent stream from the permeate zone 32 may be introduced as a portion of the feed stream entering feed zone 50 through conduit 33. Further a sweep stream may be introduced into permeate zone 54 through conduit 51 and withdrawn from the permeate zone through conduit 53. A gas stream comprising helium and beta-pinene present in a greater concentration than that withdrawn from the gas chromatographic column 16 is withdrawn from the feed zone 50 through conduit 56 and passed through a condenser 58 to cool the effluent stream to 50° C. or below, whereupon the beta-pinene is condensed and any massive condensate recovered as product. The cooled gas effluent stream is sent to a phase separator 60 such as a gas-liquid cyclone separator wherein additional beta-pinene is recovered, and sent to the accumulator vessels 62. The helium gas from the phase separator 60 containing some residual traces of the beta pinene not recovered in the condenser 58 or phase separator 60 is recycled through conduit 64 into recycle conduit 66 for introduction into the feed zone of the first membrane unit 30.

In the operation described a two-stage permeation membrane apparatus is shown; however, it should be recognized that one or multi-stage permeation membrane units may be employed depending upon the degree of concentration desired. In any chromatographic system it is, of course, contemplated that temperature, pressure, pulse or other programming of the column, for example the heating of the column in a predetermined manner, may be used to aid or enhance the chromatographic separation of the sample mixture introduced into the column. In addition, the chromatographic system may also employ integrators and recorders in connection with the detector to provide an indication of peak area and evolution times for each particular individual fraction or component. Further my process has been described in connection with the opening and closing of certain valves and conduits and it should be recognized that the installation may comprise solenoid operated valves or valves responsive to the impulses of the detector or other instruments so that automatic switching of the gas streams will take place during the collection and recovery operation. The separatory materials employed in chromatographic columns are well-known, and include solids, solids or gels having liquid coating thereon, ion exchange resins, or gel-like polymeric materials having an open or porous structure therein.

Where the fraction to be recovered from the effluent stream represents a very minor portion of the fluid stream, it may be most desirable to permeate the fraction to be concentrated or recovered, rather than the permeation of the bulk of the carrier stream. For example, where the sample mixture to be passed through the chromatographic column comprises a hydrocarbon mixture or a substituted hydrocarbon wherein membrane materials are readily available for the separation of these mixtures such as para and meta xylene mixtures, cresol mixtures, butene-isobutylene mixtures and the like, then my process may be carried out with the gas fraction concentrated in the permeate zone and the gas fraction subsequently condensed and recovered with the carrier gas being recycled from the feed zone back to the carrier gas system.

Figure 2:
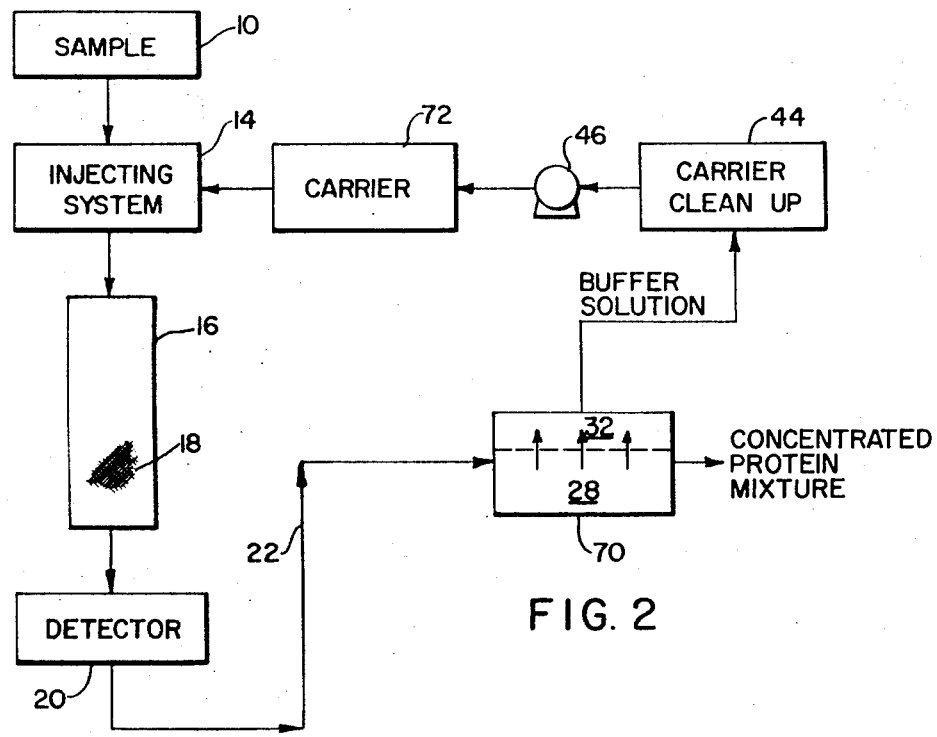
FIG. 2 is a schematic flow process diagram for a liquid chromatographic system for concentrating a solution.

FIG. 2 illustrates a system of employing a membrane system to concentrate the diluted effluent from a liquid chromatographic system. For example, an aqueous feed mixture of proteins in a salt solution is introduced into injecting system 14 as sample 14. In column 16 the salt is retained on separatory material 18 which is sufficiently porous to retain the salt but not the protein. The protein exits the column first, passes through detector 20 to the feed zone 28 of a membrane 70. The membrane is selected with characteristics which retain the higher molecular weight protein but which will pass into the permeate zone 32 the buffer solution in which the protein was being carried. The buffer solution is passed to carrier clean-up 44 where it is further concentrated and purified and, in the embodiment shown, transferred through pump 46 to carrier storage 72 from which it can be recycled into the column. The thus-concentrated protein mixture is removed from feed zone 28 and may then be processed further.

Figure 3:
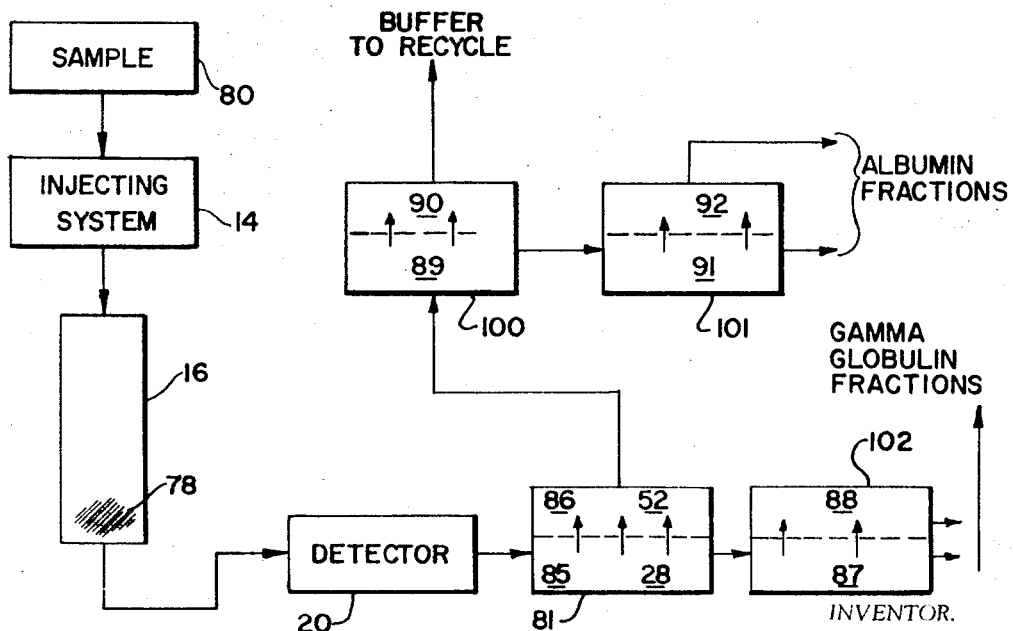
FIG. 3 is a schematic flow process diagram showing the separation of protein solutions.

FIGURE 3 illustrates a system of employing a membrane system to further separate and process the effluent stream from a liquid chromatographic column. For the purposes of illustration only, a liquid chromatography column 16 containing "Sephadex G. 25" as separatory material 78, is employed to separate blood plasma 80 composed of a human albumin fraction, a gamma globulin fraction, buffer solution (used to maintain a constant pH in the protein solution) and salts, which is introduced through injecting system 14. The plasma fraction being of much high molecular weight will emerge from the column first, followed by the salt peak which is monitored by detector 20. The effluent is fed to the feed zone 85 of a first membrane unit 81 wherein the membrane material is selected to provide for a high molecular weight cutoff of about 50,000 such as a cellulose acetate membrane of proper pore size. The buffer and lower molecular weight albumin pass into the permeate zone 86 while the retained concentrated gamma globulin portion is recovered from the feed zone 85. The permeate mixture is then fed to the feed zone 89 of a membrane unit 100 being a membrane material of very low molecular weight cutoff, e.g. less than 1000 such as 100–200. The water and buffer pass through the membrane into the permeate zone 90 where they are recovered or recycled (after clean up through an absorbent bed, etc.) back to a column or other processing operations. The higher molecular weight albumin is retained in feed zone 89 and recovered from the feed zone where it may be further separated by means of membrane unit 101 into fractions of different membrane weights, e.g. 10,000–60,000 from the feed zone 91 and permeate zone 92. The gamma globulin product may be further separated in the same manner as the albumin fraction by the selection of appropriate membrane material in membrane 102 having feed zone 87 and permeate zone 88.

My process provides a novel, unique and improved method and apparatus for the collection of chromatographic fractions from a chromatographic system and avoids many of the difficulties associated with prior collection techniques.

What I claim is:

1. A chromatographic system for the separation of fluid mixtures and the collection of one or more of the fractions so separated which system comprises:
    a chromatographic column containing separatory material therein for the separation of fluid mixtures;
    means to introduce a fluid sample mixture into the chromatographic column;
    means to introduce a fluid carrier stream into the column;
    means to withdraw from the column a fluid effluent stream comprising the carrier stream and the fraction to be recovered;
    at least one membrane permeation unit comprising a feed zone and a permeate zone separated by a thin membrane material, the membrane material selected to have a permeation affinity for one component of the effluent stream withdrawn from the chromatographic column;
    means to introduce the effluent stream withdrawn from the column into the feed zone of the membrane unit whereby at least one component of the effluent stream permeates through the membrane and into the permeate zone of the membrane unit;
    means to withdraw from one zone of the membrane unit an effluent stream enriched in the fraction to be recovered;
    means to withdraw from the other zone of the membrane unit an effluent stream enriched in the carrier fluid; and
    means for recycling at least a portion of the fluid effluent stream to the feed zone of the membrane unit.

2. The apparatus of claim 1 which includes a means to recycle the effluent stream enriched in carrier fluid for use in the chromatographic column.

3. The apparatus of claim 1 which includes a plurality of membrane units in a multi-stage permeation system whereby the stream withdrawn from the feed zone of the first unit is introduced as a portion of the feed stream to another membrane unit and wherein the stream withdrawn from the permeate zone is introduced as a portion of the stream into the feed zone of another membrane unit.

4. The apparatus of claim 1 wherein the fluid carrier stream is a gas stream and the sample mixture stream is a gas stream and the membrane is so selected to permit the passage of the carrier gas and wherein the carrier gas-enriched effluent stream is withdrawn from the permeate zone and recycled for use in the gas chromatographic column and a gas effluent stream enriched in the gas fraction to be recovered is withdrawn from the feed zone of the membrane unit.

5. The apparatus of claim 4 which includes means to compress the gas effluent stream withdrawn from the gas chromatographic column prior to introducing the stream into the membrane unit.

6. A process for separating a sample material into chromatographic fractions and recovering at least one of the fractions so separated, which process comprises:
    introducing a sample material into a chromatographic column containing separatory material therein for separating the material so introduced into two or more chromatographic fractions;
    introducing a carrier fluid into the chromatographic column;
    withdrawing from the chromatographic column a fluid effluent stream comprising carrier fluid and a fraction to be recovered;
    concentrating the fraction to be recovered in a fraction-enriched stream by introducing the effluent stream into a feed zone of at least one membrane unit comprising a feed zone and a permeate zone separated by a thin membrane material having a permeation affinity for one component of the effluent stream;
    withdrawing a fraction-enriched stream from one zone of the membrane unit; and
    recycling at least a portion of the resulting effluent stream to the feed zone of the membrane unit.

7. The process as defined in claim 6 wherein said sample is a liquid and at least one of said membrane units contains a membrane which retains in the feed zone of said membrane unit material having a molecular weight of under 1000.

8. The process as defined in claim 7 wherein the sample material includes an enzyme having a fraction of less than 1000 molecular weight.

9. The process as defined in claim 6 wherein said sample is a liquid and at least one of said membrane units contains a membrane which retains in the feed zone of said membrane unit material having a molecular weight in excess of 100.

10. The process as defined in claim 6 wherein said sample and carrier are liquids and wherein a first membrane unit retains material in the feed zone having a molecular weight in excess of 40,000, the material in the permeate zone of said first membrane unit passing to a second membrane unit wherein material having a molecular weight in excess of 100 is retained in the feed zone and material having a molecular weight of less than 100 and carrier liquid, permeates the membrane, the fraction-enriched stream from the feed zone of each membrane unit being fed into subsequent membrane units, said subsequent membrane units having a permeation affinity for one component of said fraction-enriched streams.

11. The process as defined in claim 10 wherein said sample material is blood plasma.

12. The process as defined in claim 6 wherein said carrier fluid and said sample material are gases and which includes the steps of condensing the fraction-enriched stream and recycling at least a portion of the resulting effluent stream from which a fraction is condensed to the feed zone of the membrane unit.

13. The process of claim 12 wherein the membrane material has a semi-permeable membrane affinity for the carrier gas, and which process includes withdrawing from the feed zone a gas fraction effluent stream and from the permeate zone a carrier gas-enriched stream which carrier gas-enriched system is recycled for use in the gas chromatographic column.

14. The process of claim 12 which includes compressing the gas effluent stream withdrawn from the chromatographic column prior to introducing the stream into the feed zone of the membrane unit.

15. A chromatographic system for the separation of fluid mixtures and the collection of one or more of the fractions so separated which system comprises:
- a chromatographic column containing separatory material therein for the separation of gas mixtures;
- means to introduce a gas sample mixture into the chromatographic column;
- means to introduce a gas carrier stream into the column;
- means to withdraw from the column a gas effluent stream comprising the carrier stream and the fraction to be recovered;
- at least one membrane permeation unit comprising a feed zone and a permeate zone separated by a thin membrane material, the membrane material selected to have a permeation affinity for one component of the effluent stream withdrawn from the chromatographic column;
- means to introduce the effluent stream withdrawn from the column into the feed zone of the membrane unit whereby at least one component of the effluent stream permeates through the membrane and into the permeate zone of the membrane unit;
- means to withdraw from the other zone of the membrane unit an effluent stream enriched in the carrier fluid;
- means for condensing at least a portion of the fraction-enriched stream withdrawn from the membrane unit; and
- means for recycling at least a portion of the fluid effluent stream from which the fraction is condensed to the feed zone of the membrane unit.

16. A process for separating a sample material into chromatographic fractions and recovering at least one of the fractions so separated, which process comprises:
- introducing a sample material into a chromatographic column containing separatory material therein for separating the material so introduced into two or more chromatographic gas fractions;
- introducing a carrier gas fluid into the chromatographic column;
- withdrawing from the chromatographic column a fluid effluent stream comprising carrier fluid and a fraction to be recovered;
- concentrating the fraction to be recovered in a fraction-enriched stream by introducing the effluent stream into a feed zone of at least one membrane unit comprising a feed zone and a permeate zone separated by a thin membrane material having a permeation affinity for one component of the effluent stream;
- withdrawing a fraction-enriched stream from one zone of the membrane unit;
- condensing the fraction-enriched stream; and
- recycling at least a portion of the resulting effluent stream from which one fraction is condensed to the feed zone of the membrane unit.

References Cited

UNITED STATES PATENTS

| | | | |
|---|---|---|---|
| 3,198,335 | 8/1965 | Lewis et al. | 210—321 |
| 3,246,450 | 4/1966 | Stern et al. | 55—16 |

FOREIGN PATENTS

| | | |
|---|---|---|
| 692,119 | 8/1964 | Canada. |

J. L. DE CESARE, Primary Examiner

U.S. Cl. X.R.

55—16, 67; 210—31, 198